United States Patent [19]

Loiseaux et al.

[11] Patent Number: 5,734,447
[45] Date of Patent: Mar. 31, 1998

[54] COMPACT BACK PROJECTION DEVICE HAVING EITHER A DIFFRACTIVE OPTICAL COMPONENT OR TWO OPTICAL MIXING COMPONENTS

[75] Inventors: Brigitte Loiseaux, Villebon Sur Yvette; Jean-Pierre Huignard, Paris; Erich Spitz, Paris; Cécile Joubert, Paris, all of France

[73] Assignee: Thomson-CSF, Paris, France

[21] Appl. No.: 626,961

[22] Filed: Apr. 3, 1996

[30] Foreign Application Priority Data

Apr. 7, 1995 [FR] France .................. 95 04177

[51] Int. Cl.⁶ .................. G02F 1/1335; G03B 21/26; G03B 21/28; G03B 21/22
[52] U.S. Cl. .................. 349/5; 353/37; 353/77; 353/98
[58] Field of Search .................. 359/40, 41; 353/31, 353/34, 37, 77, 98; 349/5, 7, 8

[56] References Cited

U.S. PATENT DOCUMENTS

| | | | |
|---|---|---|---|
| 3,711,188 | 1/1973 | Zehnpfennig | 350/106 |
| 3,941,467 | 3/1976 | Kapany et al. | 353/34 |
| 5,048,949 | 9/1991 | Sato et al. | 359/40 |
| 5,181,054 | 1/1993 | Nicolas et al. | 353/20 |
| 5,206,674 | 4/1993 | Puech et al. | 353/122 |
| 5,258,969 | 11/1993 | Refregier et al. | 369/100 |
| 5,272,496 | 12/1993 | Nicolas et al. | 359/40 |
| 5,298,740 | 3/1994 | Ayral et al. | 385/122 |
| 5,299,036 | 3/1994 | Nicolas et al. | 359/40 |
| 5,307,306 | 4/1994 | Tournois et al. | 364/822 |
| 5,323,372 | 6/1994 | Puech et al. | 369/100 |
| 5,394,412 | 2/1995 | Huignard et al. | 372/9 |
| 5,402,261 | 3/1995 | Huignard et al. | 359/300 |
| 5,410,421 | 4/1995 | Huignard et al. | 359/49 |
| 5,416,617 | 5/1995 | Loiseaux et al. | 359/51 |
| 5,428,697 | 6/1995 | Dolfi et al. | 385/24 |
| 5,467,206 | 11/1995 | Loiseaux et al. | 359/40 |
| 5,475,525 | 12/1995 | Tournois et al. | 359/245 |
| 5,573,324 | 11/1996 | De Vaan | 353/77 |

FOREIGN PATENT DOCUMENTS 0 488 590   6/1992   European Pat. Off.
0 657 769   6/1995   European Pat. Off.

*Primary Examiner*—William L. Sikes
*Assistant Examiner*—Walter Malinowski
*Attorney, Agent, or Firm*—Oblon, Spivak, McClelland, Maier & Neustadt, P.C.

[57] ABSTRACT

A back projection device comprises an image generator (GI), an onward reflection mirror (MR) and at least one optical component (OM) capable of reflecting certain types of light beams almost entirely and reflecting certain other types of light beams almost entirely, said component being located in the proximity of a screen (E). The selection of optical behavior of the component (OM) may be done as a function of the polarization of the light beam, or else also as a function of its orientation with respect to said component (OM). Application: displays.

5 Claims, 6 Drawing Sheets

COMPACT BACK PROJECTION DEVICE HAVING EITHER A DIFFRACTIVE OPTICAL COMPONENT OR TWO OPTICAL MIXING COMPONENTS

BACKGROUND OF THE INVENTION

1. Field of the Invention

The field of the invention is that of display systems which are now developing particularly towards the presentation of high-resolution images having increasingly larger sizes, typically sizes of over one meter diagonally.

More specifically, the invention relates to a novel type of back projector that is more compact by virtue of which it is possible to envisage the making, in the short term, of flat screens designed for the display of large-sized images.

2. Description of the Prior Art

At present, back projection devices have a screen placed between the observer and the image generator, whether it be a cathode-ray tube or a liquid crystal modulator working according to the common diagram shown in FIG. 1. The image coming from the image generator (GI) through a projection optical system (OP) is sent on by means of a main mirror $M_p$ to the screen, the mirror $M_p$ being oriented typically by an angle $\alpha$ of 45° with respect to the screen and making it possible to reduce the space occupied between the image generator and the screen by half as compared with the space required for a frontal projection of the image on the screen.

To further reduce the depth e of the back projector, the invention proposes a back projection device in which the angle between the screen (E) and the onward reflection mirror $M_p$ may be reduced through the presence of a "mixer" type optical component located close to the plane on which the final image is formed.

SUMMARY OF THE INVENTION

More specifically, an object of the invention is a back projection device comprising a system (GI) for the generation of a small-sized image, a projection optical system converting the small-sized image into a large-sized image ($I_1$) and a screen (E) on which the final image ($I_f$) is formed, wherein said device comprises at least one onward reflection component (MR) and an optical mixing component (OM) in the proximity of the screen (E), capable of achieving the reflection, in the region of an average incidence $\theta_1$, of almost the entire image ($I_1$) as an image ($I_2$) and capable of achieving the transmission, in the region of an average incidence $\theta_o$, of almost the entire image ($I_f$) created by reflection of the image ($I_2$) on the component (MR).

Thus, the optical mixing component (OM) is characterized by the fact that it is used locally both in transmission and in reflection.

The two optical components (OM) and (MR), which are respectively mixing and onward reflection components, are thus associated to reduce the space requirement of the back projection device.

Preferably, the optical mixing component may be:

a polarization selective mirror capable of reflecting a first type of polarization and capable of transmitting the other type of polarization. It may advantageously be a cholesteric liquid crystal mirror;

a diffractive optical component possessing a grating structure whose reflection properties are selective as a function of the angle of incidence of the light flux.

Preferably, the image generator (GI) is an assembly associating a liquid crystal modulator and a light source, having a smaller geometrical extent than that coming from the cathode-ray tubes.

The back projector according to the invention may advantageously comprise two optical mixing components $(OM)_1$ and $(OM)_r$ so as to further reduce the space requirement of the device by confining the optical path of the light flux, namely by making it perform several to-and-fro journeys. More specifically, this device comprises a component $(OM)_1$ located in the proximity of the screen (E), a component $(OM)_r$ located between the component $(OM)_1$ and a standard optical onward reflection component (MR), the component $(OM)_r$ being capable of transmitting almost the entire image ($I_1$) and almost the entire image ($I_2$) created by the reflection of the image ($I_1$) on the component (MR) and the component $(OM)_r$ being capable of reflecting almost the entire image ($I_2$) created by the reflection of almost the entire image ($I_2$) on the optical mixing component $(OM)_1$, the image ($I_2$) being reflected as the image ($I_f$) transmitted by the component $(OM)_1$.

BRIEF DESCRIPTION OF THE DRAWINGS

The invention shall be understood more clearly and other advantages shall appear from the following description, given by way of a non-restrictive example and with reference to the appended figures, of which.

MORE DETAILED DESCRIPTION

Figure 1:
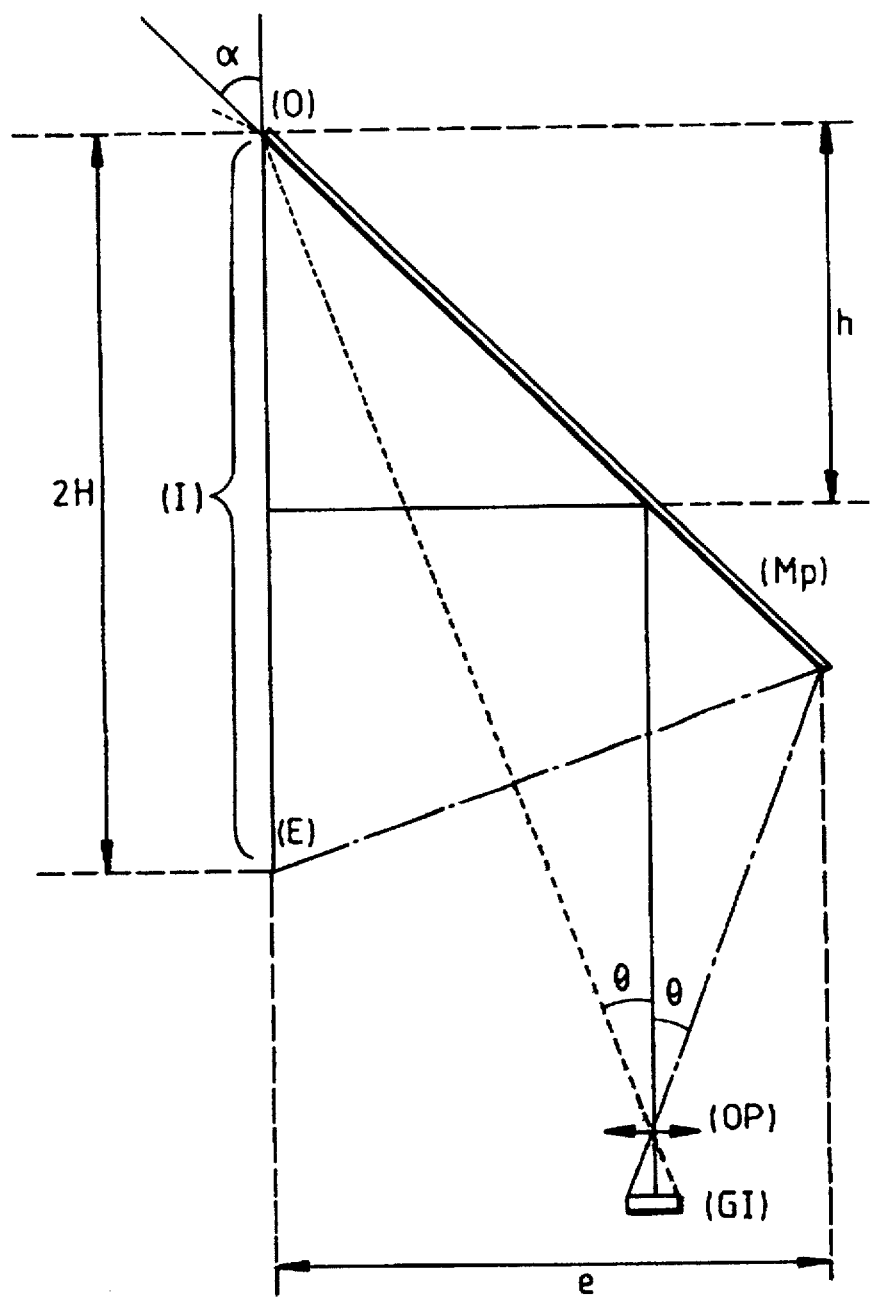
FIG. 1 shows a back projection diagram according to the prior art using a mirror positioned at 45° with respect to the screen.

FIG. 1 shows a back projector configuration according to the invention in which the image generator (GI) creates a light beam through a projection optical system (OP). This light beam gets reflected on the onward reflection mirror (Mp) to form an image (I) on the screen. Given the optical projection device used, which conditions the angle $\theta$, the overall space requirement e of this device is given by the following equation (1): $e = (h+H) \sin \alpha \cos \theta / \cos (\alpha - \theta)$ if h represents the position of the central ray of the light beam forming the image (I) with respect to the point (O) defining the top of the screen;

if 2H represents the height of the image (I);

if $\alpha$ represents the angle between the screen (E) and the mirror (Mp).

For example, when the projection optical system (OP) has a focal length of 50 mm (that is, a projection with a magnification of 13.5), the image generator has a 7.6 cm (3") diagonal, the screen has a diagonal of 101 cm (500×900 mm$^2$) and, for a position $\alpha=45°$ with $\theta=20°$ and $2H=500$ mm, there is a space requirement e of 367 mm.

Figure 2:
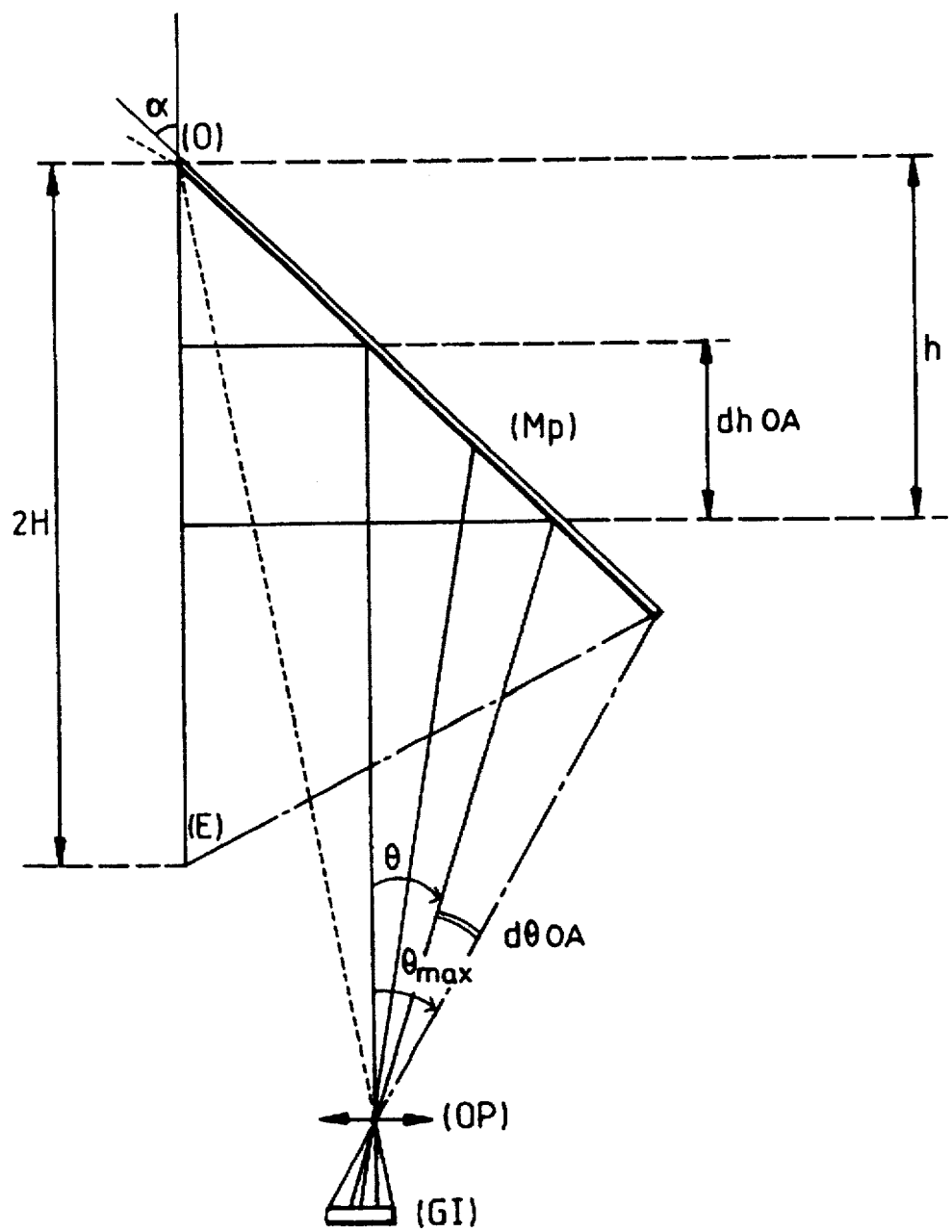
FIG. 2 gives a schematic view of a back projection device according to the prior art in which the image generator (GI) is out of alignment with respect to the projection optical system (OF)

It may be noted that it is possible to reduce this space requirement e by envisaging an off-axis operation, namely by off-centering the image generator (GI) with respect to the optical projection system (OP). FIG. 2 shows this configuration in which the central ray is offset by an angle $d\theta_{OA}$ and therefore the center of the image is offset by a height $dh_{OA}$ with $\tan d\theta_{OA} = dh_{OA} \cdot \tan \theta/H$.

The maximum angle $\theta$max equal to $\theta+d\theta_{OA}$ makes it possible to off-center the system while confining the entire image (I) on the screen.

Thus, for $\alpha=45°$, $\theta=20°$, $2H=500$ mm, $dh_{OA}=h/2$, $D\theta_{OA}=10°$.

There is obtained a space requirement e, given by the equation (1), equal to a value of 286 mm.

Figure 3:
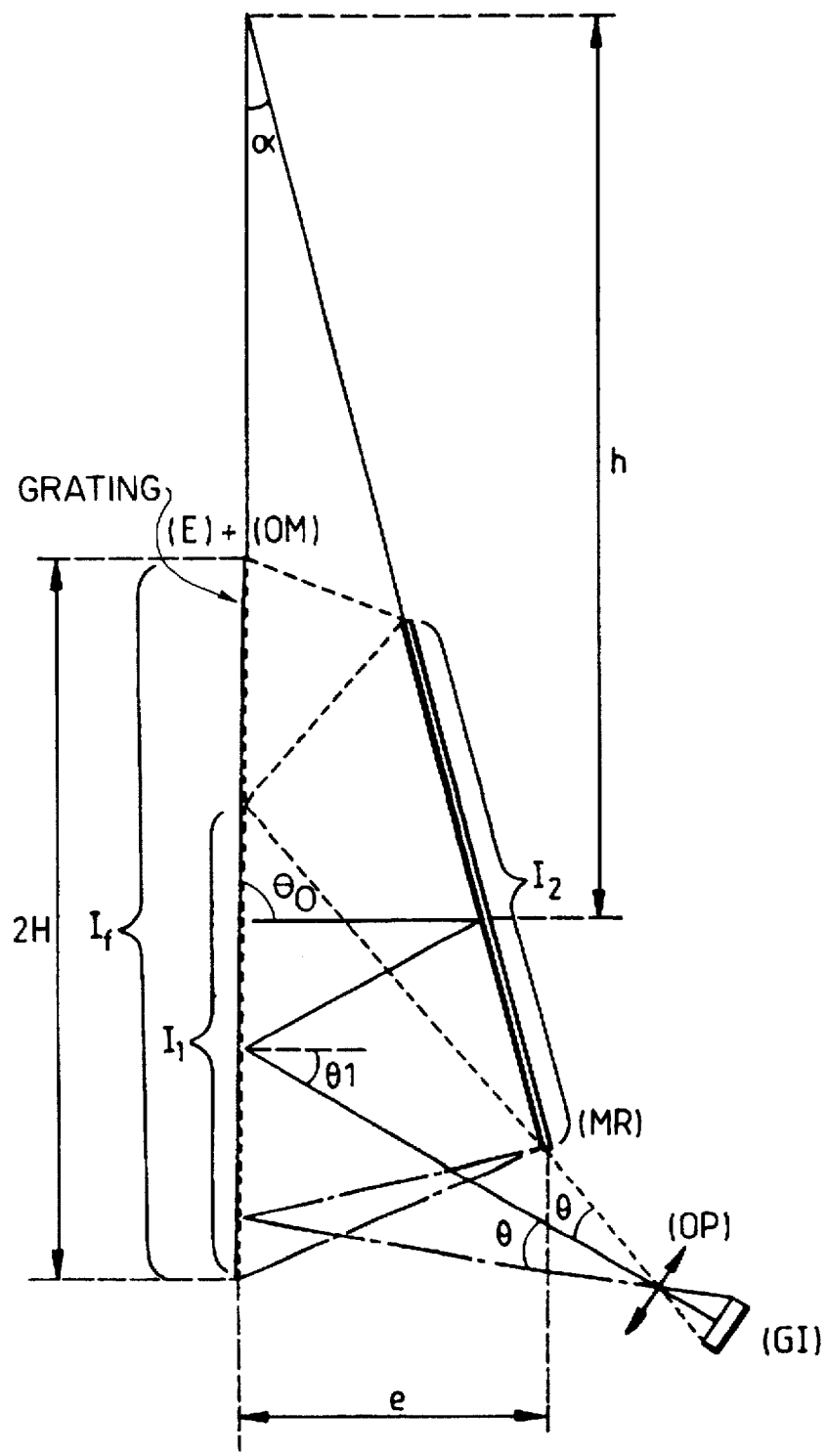
FIG. 3 shows an exemplary back projection device according to the invention using a component (OM)

FIG. 3 shows a back projection device according to the invention made more compact than the prior art back projection devices through the association of at least one standard onward reflection mirror (MR) and an optical component enabling both the "folding" of the light beam created by the image generator (GI) and the transmission of said beam to the display screen (E). The presence of a mixing component of this kind enables the almost entire transmission of the image, unlike in the case of the semi-reflecting mirror which one might be tempted to use to achieve the same optical confinement but which would give a loss of light flux that is about four times greater.

The diagram of FIG. 3 illustrates the general principle of the back projection device according to the invention. Using an image generator (GI), preferably of a liquid crystal display modulator (LCD) type associated with a light source having a small incident divergence and a small space requirement, a projection optical system (OP) is used to generate a large-sized virtual image ($I_1$) that is reflected a first time, in the region of an average incidence $\theta_1$ by the optical mixing component (OM) to form a second virtual image ($I_2$). This second image is then reflected by the onward reflection component (MR) to form the final image ($I_f$) on the screen (E) transmitted by the component (OM) in the region of the normal incidence $\theta_o$.

It may be noted that the optical system (OP) and the image generator (GI) are preferably added to the space requirement e through the presence of an auxiliary standard onward reflection mirror (not shown in FIG. 3).

In the present case, the height h is defined as follows:

$$h = H/\tan 2\alpha \cdot \tan (\alpha+\theta)$$

and $e = H \sin \alpha \cos \theta / \sin 2\alpha \cdot \sin (\alpha+\theta)$ the height $h_{min}$ being defined so that the entire image reflected by (OM) reaches the onward reflection mirror (MR) to generate the image ($I_f$).

with $\alpha=15°$, $\theta=20°$, $2H=500$ mm
there is obtained $h_{min} \sim 618$ mm and a space requirement e of 212 mm.

Figure 4:
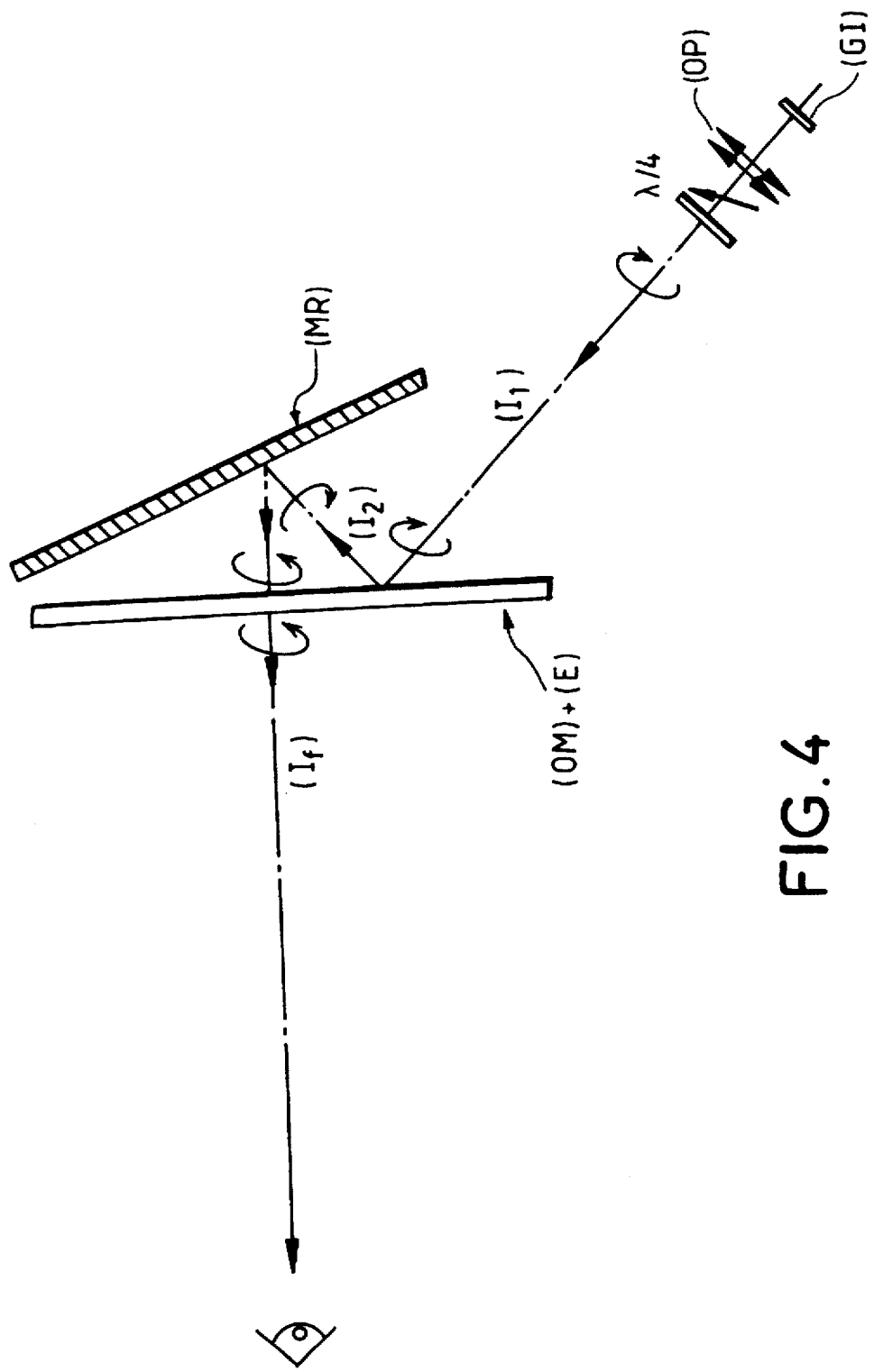
FIG. 4 gives a schematic view of an exemplary back projection device in which the component (OM) is polarization selective.

In a first exemplary embodiment, the mixing optical component (OM) is a polarization selective cholesteric mirror. It may, for example, reflect a light having a "left circular" type of polarization and transmit a "right circular" type of polarization without losses. n this respect, the device shown in FIG. 4 reveals the different changes of polarization of the light:

Using with the LCD type image generator (GI), a rectilinearly polarized light is created. This polarization is converted with a quarterwave plate ($\lambda/4$) into a left circular polarization. The cholesteric component (OM) reflects this light without changing the polarization unlike a standard reflector. The "left circular" polarized reflected light is then reflected by the metallic mirror type reflector (MR), thereby creating a "right circular" type polarized light (the arrows shown in the drawing relate to the direction in which the polarization of the light rotates during its optical path).

The "right circular" polarized light is transmitted by the component (OM) and thus reaches the screen from which the images are perceived by an observer located on the side opposite to the image generator (GI) with respect to the screen.

More specifically, the component (OM) may comprise polymer films containing cholesteric liquid crystal, the high birefringence of this type of material making it possible to attain spectral bands (in which the requisite conditions or transmission and reflection are met) that are big and greater than 80 nm.

It is thus possible to cover the entire visible spectral domain, namely about 200 useful nm approximately, by superimposing two or three films of this type, each being centered on different wavelengths. Components of this kind exist, at present with dimensions in the range of 30×30 cm$^2$. The centering of their spectral band may be obtained by controlling the polymerizing temperature of the polymer film (cf. SID Digest 94; pp. 399-402: "Cholesteric Reflectors With A Color Pattern").

Indeed, the cholesteric liquid crystals are organized in helix form. The pitch of the helix, which may vary with temperature, conditions the reflected wavelength. It is thus enough to set the temperature in order to control this helix pitch and then polymerize the film to freeze the orientation of the liquid crystal dispersed in the polymer.

In a second example, the mixing function of the component (OM) may be achieved by the presence of a diffraction grating.

The diffraction grating is designed to be operational along the angle $\theta_1$ defined in FIG. 3 while the polarization of light may be of any type. In the case of an (LCD) image generator, there is a small-sized projection source. This makes it possible to reflect almost all the light emitted even if the grating structure has low angular acceptance.

When the light has been reflected by the component (OM), it is again reflected by the onward reflection component (MR) and again reaches the component (OM) but at an incidence $\theta_o$ close to the normal which is not in the angular passband of the volume diffractive component (OM).

To make the necessary grating structure, it is possible to use bichromatic gelatin or photopolymer type materials in which it is possible to create index variations possibly ranging from 0.05 to 0.1

Figure 5:
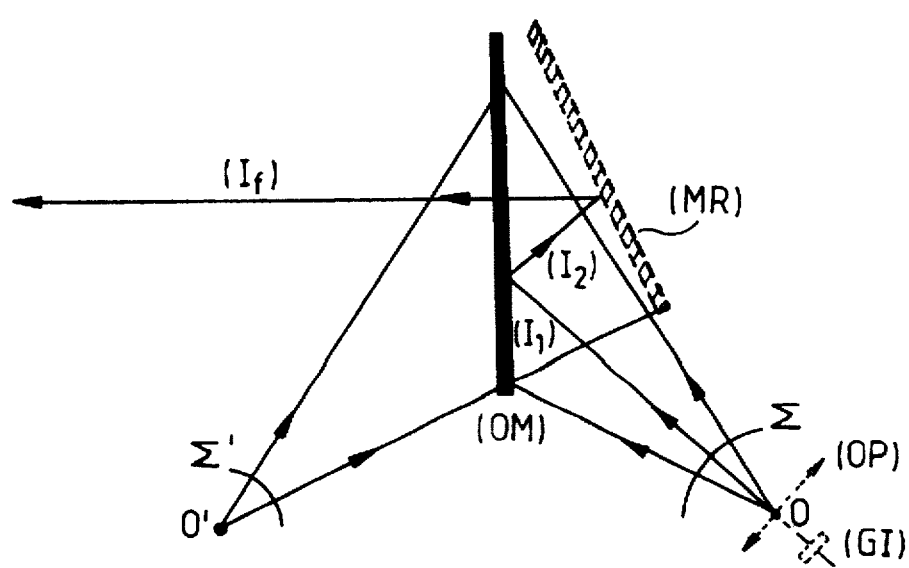
FIG. 5 illustrates the making of a grating structure that is photo-induced by the interference of two spherical optical waves.

These index variations may be photo-induced by means of two spherical waves $\Sigma$ and $\Sigma'$ as shown in FIG. 5, of which the centers of curvature 0 and 0' are such that:

(0) is located at the center of the projection objective (OP);

(0') is symmetrical with (0) with respect to the mixing diffractive component (OM).

The layers thus created are parallel to the plane of the component and a wavelength non-dispersive mirror function is obtained: it works in the region of a given incidence and for a spectral width that depends chiefly on the index variation photo-induced in the material.

For the efficient reflection of the three primary colors, red, green and blue, it is possible to achieve a superimposition of several components each comprising at least one mirror function, centered on different spectral components. It is also possible to carry out the multiplexing, in one and the same film, of several mirror functions, each centered on the spectral components red, green and blue.

In another variant of the invention, an additional mixing optical component (OM)$_r$ located between the component (OM)$_1$ and the mirror (MR) is used.

Figure 6:
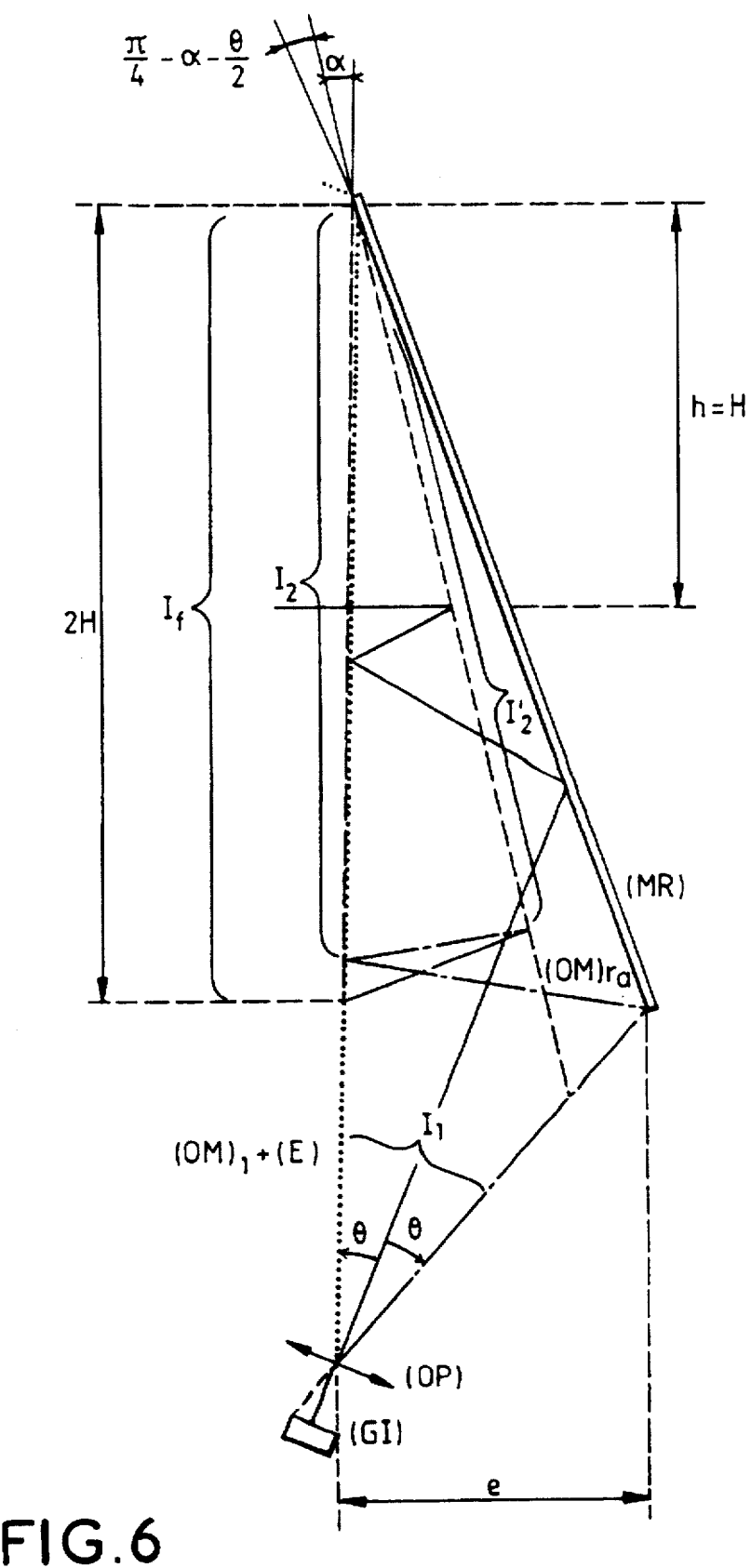
FIG. 6 exemplifies a back projection device according to the invention using two optical mixing components $(OM)_1$ and $(OM)_r$.

Such a configuration is illustrated in FIG. 6 to show the feasibility of an even more compact device. The two mixing components (OM) and (OM)$_r$ have reflection and transmission properties suited to the values of incidence used. Their angular passband may typically be adapted by means of the value of the index variation photo-induced in the case of the use of diffractive components. FIG. 6 illustrates the formation of the final image (I$_f$) on the screen using the image (I$_1$) created by the image generator (GI). The image (I$_1$) is transmitted by the component (OM)$_r$ and then reflected as an image (I$_2$) by the onward reflection mirror (MR). The image (I$_2$) is also transmitted by the component (OM)$_r$ and then reflected as an image (T$_2$) by the component (OM)$_1$ so as to be reflected by the component (OM)$_r$ as an image (I$_f$) transmitted by the component (OM)$_1$.

As compared with the device illustrated in FIG. 3 the component (OM)$_r$ makes it possible to "raise" the image in the angle defined by the screen and the onward reflection mirror (MR). It becomes possible to define h$_{min}$=H and the space requirement e is in this case expressed by the following equation:

$$e = h \; sine \; (\pi/4-\alpha+3\theta/2)/sine \; 2\theta . sine \; (\pi/2-\alpha+\theta/2).$$

In this case, with $\alpha=15°$, $\theta=20°$, 2H=500 mm, a space requirement e of about 188 mm is obtained.

It may be noted that the forms of optical architecture proposed preferably use projection objectives (OP) working on the axis. This has the advantage of simplifying their optical combination. Nevertheless, given the small geometrical extent of the beam used to illuminate the LCD type image generators, it is also possible to envisage an operation that is off axis by some degrees without particularly increasing the complexity of these objectives as is valid in FIG. 2 in the case of prior art back projection devices.

What is claimed is:

1. A back projection device comprising:

an image generator which generates a small-sized image;

a projection optical component which converts the small-sized image into a large-sized image;

a screen on which a final image is formed;

at least one onward reflection component located at an acute angle to the screen; and an optical mixing component, having a predetermined length, located between said at least one onward reflection component and said screen, wherein the large-sized image is substantially reflected along an entirety of said predetermined length for a first range of incident angles and wherein an image reflected by the onward reflection component is substantially transmitted along the entirety of said predetermined length for a second range of incident angles to form the final image, wherein the optical mixing component is a diffractive optical component having a reflectivity which is selective as a function of a range of incident angles.

2. A back projection device according to claim 1, wherein the image generator is a liquid crystal modulator.

3. A back projection device according to claim 1, wherein the optical mixing component has a grating structure having a pitch which is substantially perpendicular to an optical axis of a light flux constituting the image.

4. A back projection device according to claim 3, wherein the grating structure is made with a photopolymer type material containing cholesteric liquid crystal.

5. A back projection device comprising:

a image generator which generates a small-sized image;

a projection optical component which converts the small-sized image into a large-sized image;

a screen on which a final image is formed;

at least one onward reflection component located at an acute angle to the screen;

a first optical mixing component located between said at least one onward reflection component and said screen; and a second optical mixing component located between said first optical mixing component and said at least one onward reflection component, wherein, for a first range of incident angles, said first optical mixing component reflects substantially an entire image reflected by said at least one onward reflection component and which for a second angle of incident angles transmits substantially an entire image reflected by said second optical mixing component to form the final image; and wherein, for a third range of incident angles, said second optical mixing component transmits substantially the entire large-sized image and the image reflected by said at least one onward reflection component and which for a fourth range of incident angles reflects substantially an entire image reflected by said first optical mixing component.

* * * * *